United States Patent
McCormack et al.

(10) Patent No.: US 7,272,223 B2
(45) Date of Patent: Sep. 18, 2007

(54) MULTI-MEDIA CONTACT CENTER

(75) Inventors: Tony McCormack, Galway (IE);
Thomas McGuire, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 548 days.

(21) Appl. No.: 10/279,045

(22) Filed: Oct. 23, 2002

(65) Prior Publication Data

US 2004/0203679 A1 Oct. 14, 2004

(51) Int. Cl.
*H04M 3/00* (2006.01)

(52) U.S. Cl. .......................... 379/265.09; 379/265.11; 379/266.01

(58) Field of Classification Search .............................
379/265.01–265.03, 265.09, 265.1, 265.11, 379/265.14, 265.08; 455/417, 414.1
See application file for complete search history.

(56) References Cited

U.S. PATENT DOCUMENTS

| | | | |
|---|---|---|---|
| 6,449,646 B1* | 9/2002 | Sikora et al. | 709/226 |
| 6,665,395 B1* | 12/2003 | Busey et al. | 379/265.09 |
| 6,714,643 B1* | 3/2004 | Gargeya et al. | 379/266.06 |
| 6,801,520 B2* | 10/2004 | Philonenko | 370/351 |
| 6,826,276 B2* | 11/2004 | Brown et al. | 379/265.02 |
| 6,845,154 B1* | 1/2005 | Cave et al. | 379/265.02 |
| 6,934,381 B1* | 8/2005 | Klein et al. | 379/265.09 |

* cited by examiner

*Primary Examiner*—Duc M. Nguyen
*Assistant Examiner*—Aung T. Win
(74) *Attorney, Agent, or Firm*—Barnes & Thornburg LLP

(57) ABSTRACT

Multi-media call centers are able to receive incoming contacts or calls in a plurality of different types of medium. For example, as email, fax, chat, web-based and other types of contact. Incoming contacts are routed to one of a plurality of agents. Each agent has one or more skills, for example, a particular agent has knowledge about sales for product X and about technical support for product Y. Associated with each skill is a queue into which incoming calls are placed until an agent with that skill becomes available. Typically further subdivision of these queues is made such that for a particular skill, there is one queue for each possible medium. Often the queues referred to above build up and end user's experience significant waiting times before reaching a call center agent. This leads to dropped calls and customer dissatisfaction. To avoid this customers are able to switch between queues of different media types (but the same skill type) in order to reduce waiting times.

8 Claims, 4 Drawing Sheets

MULTI-MEDIA CONTACT CENTER

FIELD OF THE INVENTION

The present invention relates to multi-media contact centers and a method and apparatus for reducing queue waiting times in such contact centers.

BACKGROUND TO THE INVENTION

Call centers are known in which incoming calls are routed to one of a plurality of agents. For example, the call center might provide help desk facilities for a particular group of products and customers who are able to call in and be allocated to an agent who has the necessary skills to deal with his or her query. Each agent has one or more skills, for example, a particular agent has knowledge about sales for product X and about technical support for product Y. An incoming call is received and information from that call is used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

More recently, multi-media call centers have become available. These types of call center are able to receive incoming contacts or calls in a plurality of different types of medium. For example, as email, fax, chat, web-based and other types of contact. Thus, the term "call centers" as used herein is not intended to be restricted to situations in which telephone calls are made to the center. Other types of call or contact are also envisaged, such as email, fax, SMS, chat, web access and any other suitable method of contact including conventional telephone calls and voice over internet protocol telephone calls. Similarly, the term "call" as used herein is not intended to be restricted to conventional telephone calls but includes contacts made by email, fax, voice over IP and any other suitable medium.

As mentioned above, associated with each skill is a queue into which incoming calls are placed until an agent with that skill becomes available. Typically further subdivision of these queues is made such that for a particular skill, there is one queue for each possible type of medium. For example, the skill may involve knowledge of product X with respect to sales and the possible types of medium may be email, telephone, and web-based contacts. In that case, three queues are available for the particular skill, one for each of the types of medium.

An ongoing problem faced by contact centres relates to management of incoming contacts such that those are dealt with as quickly and effectively as possible. Often the queues referred to above build up and end user's experience significant waiting times before reaching a call center agent. This leads to dropped calls and customer dissatisfaction.

An object of the present invention is therefore to provide a multi-media contact center which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

As mentioned above, multi-media contact centers typically have several skills and a plurality of queues for each skill, where each queue is for a specific type of medium such as email or voice. The present invention recognises that the lengths of these queues varies so that for a particular skill, the email queue may be short compared to the voice queue. This is exploited in the present invention by allowing items to be switched between queues in order to obtain shorter queue waiting times. There are various different ways in which this can be achieved, for example, by allowing the customer to make multiple contacts for the same issue, each in a different medium, or by calling back the customer using a different medium.

According to a first aspect of the present invention there is provided a multi-media contact center for receiving contacts in a plurality of types of medium from each of a plurality of end users, said contact center comprising:
  a plurality of queues associated with one skill type, each of said queues being for contacts of a different medium;
  a processor arranged to remove a first item from a first one of the queues and add a corresponding second item of different medium in a second of the queues.

This provides the advantage that the processor is able to take an item out of one queue where the waiting time is expected to be long for example, and move it to a queue for the same skill but different type of medium, where the waiting time is expected to be shorter. Thus preferably, the processor is further arranged such that the time taken for said second item to reach the head of the second queue is less than the anticipated time taken for said first item to reach the head of the first queue.

In one example, the first item comprises an inbound contact made by an end user to the contact center. However, it is also possible for the first item to be a request for an outbound contact to be made from the contact center to the end user.

Similarly, the second item may comprise an inbound contact made by an end user to the contact center or a request for an outbound contact to be made from the contact center to the end user.

Preferably the processor is further arranged to send information to an end user about lengths of at least the first and second queues. This is advantageous because then the customer is able to assess the relative lengths of the queues and decide whether or not to request to switch queues.

Preferably the processor is integral with a queue manager. This gives the advantage that an existing queue manager within the contact center can be adapted to provide the present invention in a cost effective manner.

According to another aspect of the present invention there is provided a method of operating a multi-media contact center for receiving contacts in a plurality of types of medium from each of a plurality of end users, said method comprising the steps of:
  maintaining a plurality of queues associated with one skill type, each of said queues being for contacts of a different medium;
  removing a first item from one of the queues and adding a corresponding second item of different medium in a second of the queues.

The invention also encompasses a multi-media contact center for receiving contacts in a plurality of media types from each of a plurality of end users, said contact center comprising:

a plurality of queues associated with one skill type, each of said queues being for contacts of a different type of medium;

an input arranged to receive a plurality of associated contacts from the same end user, said contacts each being of a different medium;

a processor arranged to determine that the plurality of received contacts are associated with one another.

This provides the advantage that a customer is able to send several contacts, all about the same issue but in different types of medium, to the contact center. The contact center is able to detect that these contacts are associated and from the same customer. In this way the customer is able to obtain a response from the contact center in the shortest time even though queues for the different media vary.

Preferably the processor is further arranged to place each of said plurality of received contacts into a queue on the basis of the type of medium the queue and the received contact; and once one of the received contacts reaches the head of its queue to delete the remaining associated queued contacts. In this way, the customer is serviced as soon as possible by an agent, as a result of whichever contact reaches the head of a queue first.

In another embodiment the processor is arranged to place only one of said plurality of received contacts into a queue on the basis of the lengths of the queues and the type of medium of the received contacts. In this case, the processor assesses which queue has the shortest length and places the associated contact into that queue. This has the advantage that the queues are not unnecessarily populated with contacts that will be later deleted.

According to another aspect of the invention there is provided a method of operating a multi-media contact center for receiving contacts in a plurality of types of medium from each of a plurality of end users, said method comprising the steps of:

maintaining a plurality of queues associated with one skill type, each of said queues being for contacts of a different medium;

receiving a plurality of associated contacts from the same end user, said contacts each being of a different medium; and determining that the plurality of received contacts are associated with one another.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
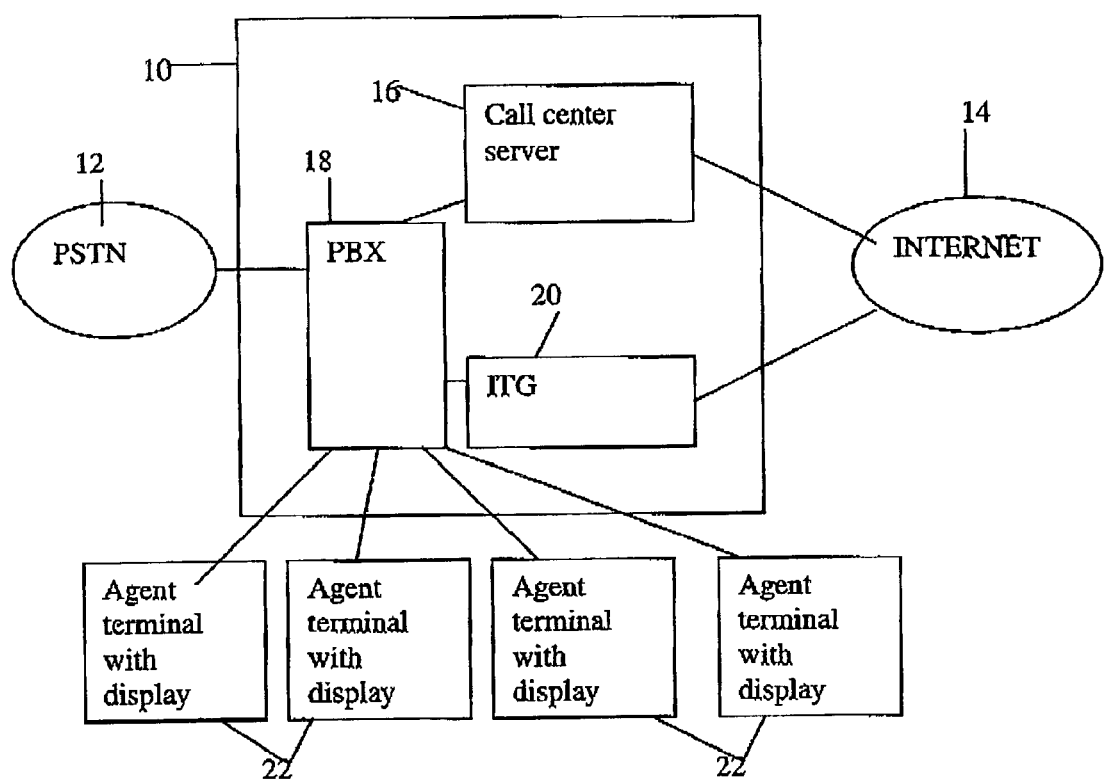
FIG. 1 is a schematic diagram of a multi-media contact center suitable for use with the present invention.

FIG. 1 is a schematic diagram of a call center 10 suitable for use with the present invention. It comprises a private branch exchange (PBX) 18 which is connected to the public switched telephone network (PSTN) 12 in order to receive and handle calls as known in the art. A plurality of agent terminals 22 are connected to the call center 10 such that incoming contacts can be directed to agents at those terminals 22. A suitable PBX is the Meridian exchange provided by Nortel Networks (trade mark) and as known to the person skilled in the art.

An internet telephony gateway (ITG) 20 connects the PBX 18 to the internet 14 and this allows the PBX to receive voice over Internet protocol (VoIP) calls from the internet and allows agents to make VoIP calls.

A contact center server 16 is also provided. This oversees and manages the running of the contact center 10 by instructing the PBX to transfer calls to suitable agent terminals. The PBX and the call center server may be integral in the same physical apparatus although this is not essential. The call center server 16 also presents information to agents and manages agent queues amongst other things as known in the art.

The contact center 10 may also comprise an email server connected between the call center server 16 and the agent terminals 22 in order to direct incoming email contacts to agents. Similarly other types of server are used in the contact center 10 to enable contacts of other types of medium to be dealt with as known in the art.

The call center server 16 comprises a queue for each skill set and associated medium type pair as known in the art and is arranged to manage those queues.

The present invention recognises that for a given skill set, several queues exist for different types of medium, and that waiting times in those queues is likely to differ. By allowing customer contacts to change queues within the set of queues for a given skill set it is possible to reduce waiting times and enable more efficient operation of the contact center itself. This is possible provided that customers are able to access the contact center using more than one type of medium.

In a first embodiment the customer is informed that there is a shorter waiting time in the queue of a particular medium. The customer is then able to issue a new contact in the particular medium such that the previous contact is deleted.

In a second embodiment the customer is informed that there is a shorter waiting time in the queue of a particular medium. The customer is then able to request that his or her original contact be automatically moved into the shorter queue.

It is not essential for the customer to be informed about the waiting times in the queues, Instead the call centre is able to "switch" a contact made by the customer from one queue to another in order to more efficiently manage contacts and without first obtaining approval from that customer for the particular "switch" For example, the contact centre comprises or has access to a registration system whereby customers register their details in advance of using the contact centre. At registration the customer specifies whether or not he or she agrees to contacts being switched between different media and also specifies which type of medium the customer is able to or prefers to receive communications in. In another example, this information is gathered and stored by the contact centre during past customer interactions instead of being provided during a registration period.

These embodiments are now described in more detail with reference to FIG. 2.

Figure 2:
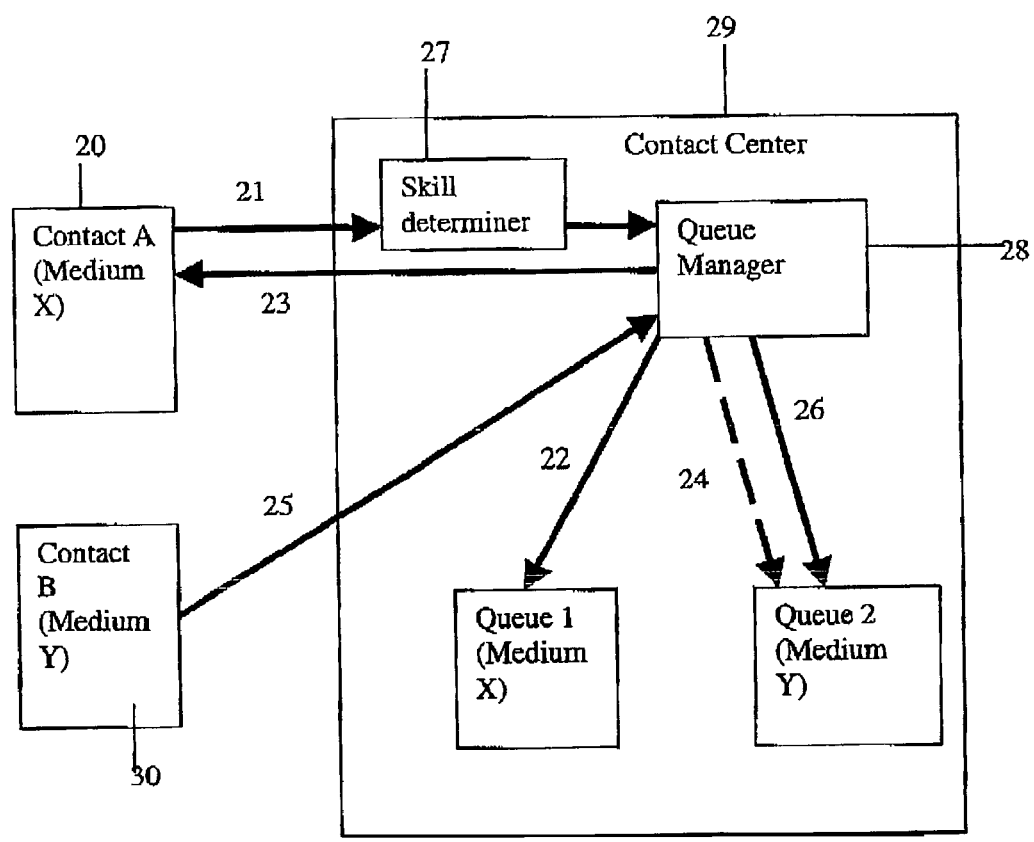
FIG. 2 is a schematic diagram of the multi-media contact center of FIG. 1 emphasizing different components and illustrating a method of operating the contact center to allow a customer to switch between queues of different types of medium.

FIG. 2 is a schematic diagram of the contact center 10 of FIG. 1 although emphasizing different components for reasons of clarity. The contact center comprises a skill determiner 27 as known in the art although this was not shown in FIG. 1. The skill determiner receives incoming contacts and classifies these into skill types. This is done using any suitable method as known in the art. For example, the skill determiner may comprise an interactive voice response (IVR) system which queries the customer in order to determine which skill type is most appropriate for that customer's request. A keyword analysis system may also be used, for example, to extract keywords from an incoming email request and use those to determine which skill is most appropriate. Database look-up systems and other known methods can also be used.

The contact center 29 also comprises a queue manager 28 which can be part of the call center server 16 of FIG. 1. This queue manager 28 manages a plurality of queues for each skill type. In the example of FIG. 2, only two queues (Queue 1 for contacts of medium X and skill R; Queue 2 for contacts of medium Y and skill R) are shown for the same skill type for reasons of clarity although in practice many more such queues are provided. For example, up to 10 types of medium per skill may be provided for around 1000 skills giving 10,000 queues altogether. The queue manager has access to information about the current queue lengths and is arranged to manage those queues as known in the art.

FIG. 2 also illustrates the situation when contact A of medium X arrives at the contact center 29. This contact 20 is input to the skill determiner 27 which allocates a skill type to the contact and forwards the contact 20 to the queue manager 28. This is illustrated by arrow 21 in FIG. 2. The queue manager then places the incoming contact 20 into queue 1 because that is the appropriate queue for the particular skill and medium. This is illustrated by arrow 22 in FIG. 2.

The queue manager 28 is arranged to send the customer who placed contact A, information about the expected wait time in queue 1 as well as information about the expected wait time for other available queues for the same skill but different media. For example, the queue manager 28 sends the customer the queue lengths for queue 1 and queue 2 (see arrow 23 in FIG. 2). The queue manager sends this information using any suitable means as known in the art. For example, by using an IVR system, chat dialog, text message, web-based contact or other mechanism. The customer is then able to use this information to decide whether to issue another contact to the contact center 29 using a different medium.

It is also possible for the queue manager to request user input from the customer as to whether or not the customer would like to change medium in order to reduce waiting time. Any suitable mechanism for this can be used as known in the an. In the situation that the customer accepts, the queue manager reserves a place in the specified shorter queue. In the example of FIG. 2, the queue manager reserves a place in queue 2. This is indicated by arrow 24 in FIG. 2.

The customer then places a new contact (contact B, medium Y) to the contact center 29 (see arrow 25 in FIG. 2) which places that new contact in the reserved queue place (see arrow 26 in FIG. 2). For example, if the user has previously registered with the contact center 29 then the contact center is able to associate the new incoming contact (contact B) with the reserved queue place. Also, the contact center 29 is able to remove the first contact (contact A) from queue 1 and drop any pending call which is still live as a result of contact A.

In order to simplify the actions needed by the customer in order to place the new contact (contact B, medium Y) then it is possible for the contact center 29 to present a web page to the customer. For example, the web page comprises a button or link which when clicked by the user allows the new contact (contact B) to be sent in the required medium.

In a second embodiment, the customer or end user does not need to make a new contact. In this situation, the existing contact of medium X is exchanged by the contact center 29 into a form suitable for another medium, say medium Y.

For example, if the original contact was made using email, then the session could initiate another type of medium such as a voice call to the same end parties, by placing a new request to the voice queue. In this example the contact centre has access to information on which type of medium the customer is able to utilise, which may have been provided as part of a registration process.

Alternatively the Agent 46, could initiate the second type of medium directly without a voice queue.

In another example, the customer or end user does not need to make a new contact, but rather requests that the contact center initiate a contact back to the customer at the appropriate time and in the new medium. For example, say the customer makes original contact A of medium X as in FIG. 2. The customer is offered the option to switch to medium Y which has a shorter waiting time. The customer agrees and the contact center reserves a place in the queue for medium Y. When that place reaches the head of the queue the contact center is arranged to initiate a call to the customer using the specified medium Y. For example, the contact center makes a voice or chat call back to the customer. This ability for the contact center to "call back" the customer is achieved using technology as known in the art.

It is also possible for the contact center itself to initiate outbound contacts. For example, this may be as part of the process described with reference to FIG. 2 above, where a customer changes contact type and the contact center calls back the customer in the new contact type. In another example, the contact center works to provide a marketing campaign whereby outbound contacts are issued by the contact center to customers in a proactive manner. A marketing campaign is just one example of how such outbound contacts can be used. Once the end user or customer receives the outbound contact from the contact center, he or she may wish to select a different medium in order to continue the communication. For example, to achieve shorter waiting times. This is described in more detail with reference to FIG. 3.

Figure 3:
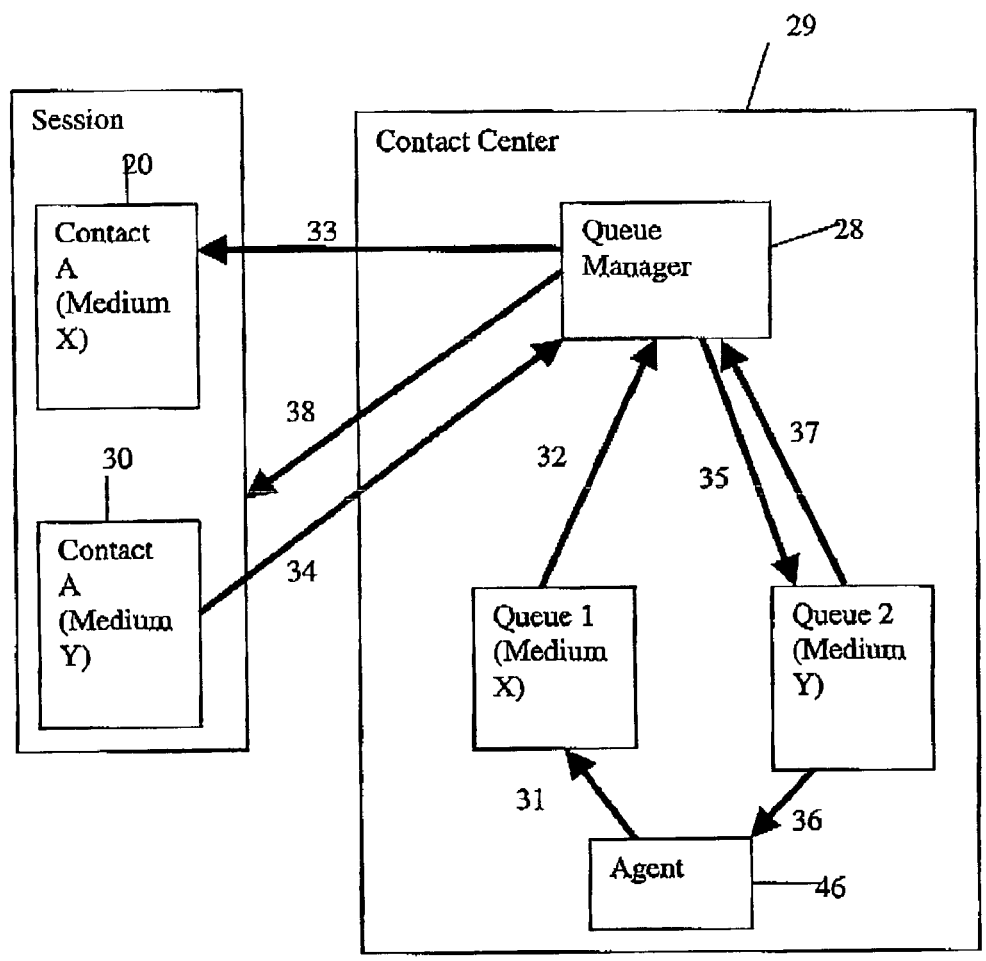
FIG. 3 is a schematic diagram a multi-media contact center according to another embodiment of the invention.

FIG. 3 is similar to FIG. 2 and the same reference numerals are used to refer to corresponding features.

Consider the situation in which an agent 46 desires to initiate an outbound contact, as part of a marketing campaign for example. The agent or agent terminal accesses a pre-specified outbound dialing list comprising contact details for potential customers who are to be contacted as part of the campaign. The agent terminal then generates an outbound contact and places an associated marker into the appropriate queue (given a pre-specified required skill and medium). This is illustrated in FIG. 3 by arrow 31 whereby a place is taken in Queue 1 for medium X. The outbound contact contains details of the end user or customer to whom that contact is directed The queue manager 28 is informed of the queue placement (see arrow 32 in FIG. 3) and then sends a message to the end user or customer specified in the queue placement (see arrow 33 in FIG. 3). The message is of medium X because queue 1 for medium X was used. An alternative option is where the agent initiates the event or call directly without the use of the queue. The message offers the end user the option of entering a communication session with an agent 46 in the contact center 29. If the end user takes up this offer, he or she then enters the communication session using medium X.

Consider the situation where the end user wishes to enter the communication but would prefer to use a different medium instead of medium X. For example, the outbound contact from the contact center 29 is made using email and the end user prefers to have a telephone call with the agent 46. In that case, the user issues a contact 30 in his or her preferred medium Y to the contact center 29. This is illustrated in FIG. 3 by arrow 34. The queue manager 28 receives this contact 30 and places it into queue 2 for medium Y (see arrow 35 in FIG. 3). When the contact 30 reaches the head of queue 2 it is directed to the agent 46 which then services the customer using medium Y.

In the example discussed above the end user is able to change media types to a preferred medium. This is further enhanced by enabling the queue manager 28 to send information about the relative queue waiting times to the customer with the estimated queue time for the proposed outbound contact type. The customer is then able to decide whether to change medium on the basis of information about relative wailing times for the different types of medium available.

In the example described with reference to FIG. 3 the end user is required to initiate the second contact 30 of medium Y in order to change media. However, this is not essential. It is also possible for the end user to indicate that he or she prefers medium Y and for the contact center to then initiate a new outbound contact to the customer using that medium.

In another embodiment the customer or end user submits a plurality of contacts to the contact center. These contacts are all in respect of the same issue or user query but are of different types of medium. The contact center is arranged to detect this and to only act on one of the contacts from that customer, for example, the contact of media type which gives the shortest delay. This embodiment is described in more detail with reference to FIG. 4.

Figure 4:
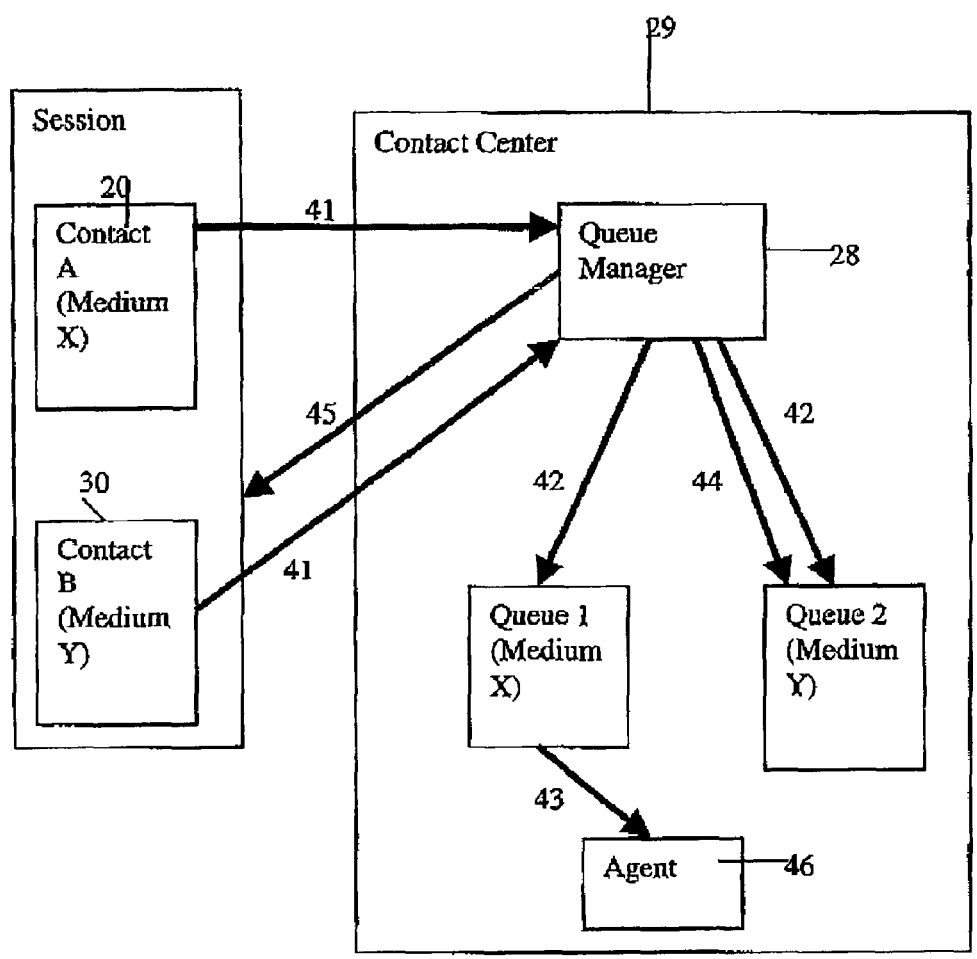
FIG. 4 is a schematic diagram of a multi-media contact center according to another embodiment of the invention.

FIG. 4 is a schematic diagram of a contact center 29 as in FIG. 2 although not showing the skill determiner for reasons of clarity. Also, one agent terminal 46 is illustrated (although there are many agent terminals in practice as described above).

In this example, the customer or end user makes a plurality of contacts about the same issue or query although in different types of medium. This is illustrated in FIG. 4 by contacts 20 and 30 of different media types X and Y. These contacts 20, 30 are associated in some way, for example, as a result of being created by the same session of a customer multimedia device; or by comprising an identifier or other marker indicating that they are associated.

Both contacts 20, 30 reach the queue manager 28 of the contact center 29 as described above with reference to FIG. 2 (see arrows 41 in FIG. 4). The queue manager then places contact A into queue 1 because that is the queue for contacts of medium X. Similarly, contact B is placed into queue 2 because that is the queue for contacts of medium Y (see arrows 42 in FIG. 4).

In the situation that contact A reaches the top of queue 1 before contact B reaches the top of queue 2, then contact A is routed to an agent 46 for processing (see arrow 43 in FIG. 4). The queue manager is aware of this and checks for associated contacts in other queues for that same skill. The presence of contact B is found in queue 2 and that item removed from is queue 2. Contact B is then terminated.

In this way the customer obtains the shortest waiting time of the available queues for the particular skill set. This is achieved even if the relative wait times of the different queues varies over time.

A variation on this method involves the queue manager placing only one of the associated contacts 20, 30 into a queue. That is, the queue manager selects the queue with the shortest waiting time and enters only one of the contacts into that queue, discarding the other associated contacts at that time. In the case that the relative waiting times for the different queues does not vary significantly over time this method enables the customer to achieve a short waiting time without the need for the contact center to make multiple queue entries.

In a preferred example, the customer or end user is provided with a simple means of creating the multiple contacts in different types of medium. For example, the user is presented with a web page whereby a button or other user interface device is selected in order to automatically generate a plurality of contacts, each of a different medium, and for the same issue or query.

Any range or device value given herein may be extended or altered without losing the effect sought, as will be apparent to the skilled person for an understanding of the teachings herein.

The invention claimed is:

1. A multi-media contact center for receiving contacts in a plurality of types of medium from each of a plurality of end users, said contact center comprising:
   a) a plurality of queues associated with one skill type, each of said queues being for contacts of a different medium;
   b) an input arranged to receive a plurality of contacts from a same end user, said plurality of contacts from a same end user each being of a different medium; and
   c) a processor arranged to determine that the plurality of contacts received from the same end user are associated with one another and to place each of said plurality of contacts received from a same end user into a queue on the basis of the medium of the queue and that of the received contact; and once one of said plurality of contacts received from a same end user reaches the head of its queue to delete the remaining associated queued contacts.

2. A multi-media contact center for receiving contacts in a plurality of types of medium from each of a plurality of end users, said contact center comprising:
   a) a plurality of queues associated with one skill type, each of said queues being for contacts of a different medium;
   b) an input arranged to receive a plurality of contacts from a same end user, said plurality of contacts from a same end user each being of a different medium; and
   c) a processor arranged to determine that the plurality of contacts received from the same end user are associated with one another and to place only one of said plurality of contacts received from the same end user into a queue on the basis of the lengths of the queues and the media type of said one of said plurality of contacts received from the same end user.

3. A method of operating a multi-media contact center for receiving contacts in a plurality of types of medium from each of a plurality of end users, said method comprising the steps of:
   a) maintaining a plurality of queues associated with one skill type, each of said queues being for contacts of a different medium;
   b) receiving a plurality of contacts from the same end user, said contacts each being of a different medium; and
   c) determining that the plurality of contacts received from the same end user are associated with one another and placing each of said plurality of contacts received from a same end user into a queue on the basis of the medium of the queue and that of the received contact; and once one of said plurality of contacts received from a same end user reaches the head of its queue to delete the remaining associated queued contacts.

4. A method of operating a multi-media contact center for receiving contacts in a plurality of types of medium from each of a plurality of end users, said method comprising the steps of:
   a) maintaining a plurality of queues associated with one skill type, each of said queues being for contacts of a different medium;
   b) receiving a plurality of contacts from the same end user, said contacts each being of a different medium; and
   c) determining that the plurality of contacts received from the same end user are associated with one another and placing only one of said plurality of contacts received from the same end user into a queue on the basis of the lengths of the queues and the media type of said one of said plurality of contacts received from the same end user.

5. A contact center as claimed in claim 1 wherein said processor is integral with a queue manager.

6. A contact center as claimed in claim 2 wherein said processor is integral with a queue manager.

7. A method of operating a contact center as claimed in claim 3 wherein said processor is integral with a queue manager.

8. A method of operating a contact center as claimed in claim 4 wherein said processor is integral with a queue manager.

* * * * *